INVENTORS
Leendert Poldervaart
Henricus Jacobus Gits
Peter Johannes Hubertus Janssen
BY [signature]
AGENT INVENTORS.
LEENDERT POLDERVAART
PETER JOHANNES HUBERTUS JANSSEN
HENRICUS JACOBUS GITS
BY Fred M Vogel
AGENT.

2,773,182
Patented Dec. 4, 1956

2,773,182

CIRCUIT-ARRANGEMENT FOR SILENT TUNING IN A FREQUENCY-MODULATION RECEIVER

Leendert Poldervaart, Peter Johannes Hubertus Janssen, and Henricus Jacobus Gits, Eindhoven, Netherlands, assignors to Hartford National Bank and Trust Company, Hartford, Conn., as trustee Application June 26, 1952, Serial No. 295,692

Claims priority, application Germany July 19, 1951

3 Claims. (Cl. 250—27)

This invention relates to a circuit-arrangement for silent tuning in a frequency-modulation receiver, comprising a demodulator tube having a plurality of control-grids, the frequency-modulated input oscillations being supplied to two control-grids with a phase shift varying with the frequency modulation, so that the demodulated oscillation is produced across a resistor included in the anode circuit of the tube. The invention is based on the method known per se, by which with an amplifying tube the working point of the tube is displaced automatically as a function of the amplitude of the input oscillations in a manner such that, if the input oscillations do not exceed a definite minimum value, the demodulated output voltage of the tube becomes substantially zero.

According to the invention a circuit arrangement for silent tuning for use in a frequency-modulation receiver, comprising a demodulator tube having a plurality of control-grids, the frequency modulated input oscillations being supplied to two control-grids with a phase shift varying with the frequency modulation so that the demodulated oscillation is produced across a resistor included in the anode circuit of the tube, is characterized in that the circuits of the two control-grids comprise a smoothing filter to produce the control-grid bias voltages by means of control-grid-current rectification and in that the said anode resistor has a value at which, in the absence of the input oscillations, the tube operates on a portion of its $i_a$—$V_a$, i. e. anode current versus anode voltage, characteristic curve having a steep slope, whilst, if the input oscillations have sufficient magnitude, the bias voltages vary automatically to operate the tube on a portion of its $i_a$—$V_a$ characteristic curve, having a gradual slope.

Figure 1:
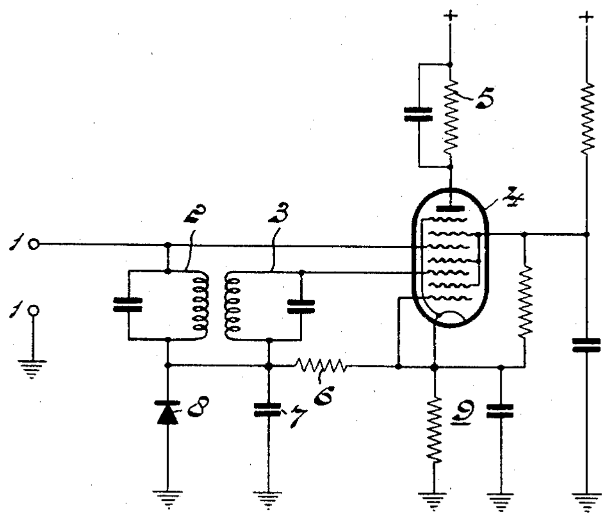
Figure 2:
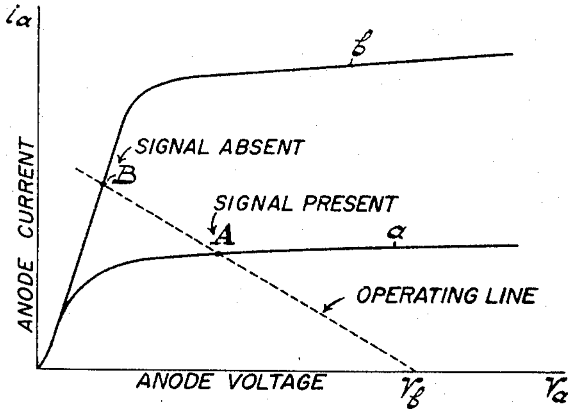
Figure 3:
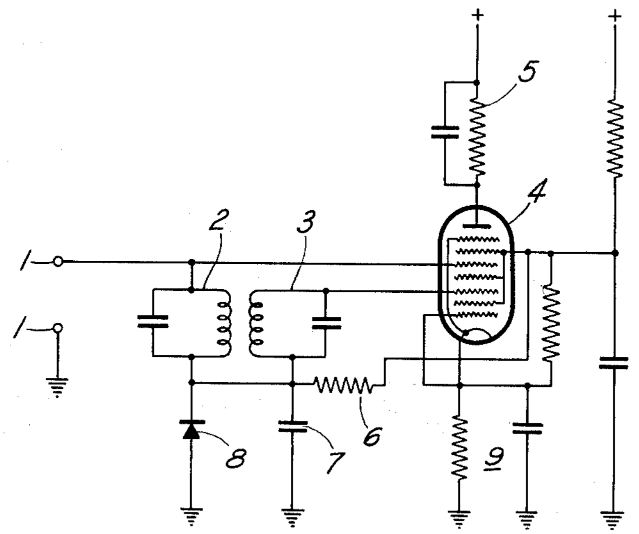

In order that the invention may be readily carried into effect, it will now be described more fully with reference to the accompanying drawing, in which Fig. 1 shows diagrammatically an embodiment of the invention, Fig. 2 shows $i_a$—$V_a$ characteristic curves of the circuit shown in Fig. 1 with two different input signal levels, and Fig. 3 shows an alternative embodiment of the invention.

Referring to Fig. 1, the frequency modulated input oscillations at the terminals 1 are supplied through intercoupled circuits 2 and 3, which produce a phase shift varying with the frequency modulation, to the two control-grids of a mixing demodulator tube 4, so that, as is known the demodulated oscillations are produced across the anode resistor 5, which is decoupled for the frequency of the input oscillations. The voltages across the circuits 2 and 3 preferably have, in this case, such high amplitudes that the voltage produced across the resistor 5 is substantially independent of this amplitude.

The circuits of the two control-grids include, on the side of the tuned circuits 2 and 3 remote from these grids, a resistor 6 and a capacitor 7, so that the bias voltage of the control-grids is produced across the capacitor 7 by control-grid current rectification. If the input oscillations have a sufficiently high value, the tube is adjusted to its correct working point. The anode current $i_a$ as a function of the anode voltage then is characterized by the curve *a* shown in Fig. 2. However, if the input oscillations remain below a definite minimum value, the bias voltage at the capacitor 7 becomes so low that the tube 4 is traversed by a comparatively high anode current, which produces a greater voltage drop across the anode resistor 5. Then the tube has an $i_a$—$V_a$ characteristic curbe *b*, as shown in Fig. 2. With a battery voltage $V_b$ and a comparatively high value of anode resistor 5, corresponding to the slope of the dotted line of Fig. 2, the working point A, corresponding to a sufficiently high input signal, is displaced to working point B, corresponding to the absence of the input signal. In the first case the tube consequently operates on the gradual slope of the $i_a$—$V_a$ characteristic curve, so that the alternating output voltage is high and in the second case the tube operates in the steep slope of this characteristic curve, so that the alternating output voltage becomes substantially zero.

As is shown in Fig. 1, the side of the circuits 2 and 3 remote from the control-grids is connected through a rectifier 8 to a point of negative voltage with respect to the cathode, for example, to earth and through the resistor 6, decoupled by the capacitor 7, to a point of positive potential with respect to earth, e. g. to the cathode of the tube, the cathode having a positive voltage with respect to earth owing to the smoothing filter 9 included in the cathode circuit. Alternatively, the resistor 6 may be connected to a point of positive potential such as a grid, for example, the screen-grid as shown in Fig. 3, having a positive voltage with respect to the cathode. The voltage produced across this smoothing filter 9 (or at the screen-grid) thus operates as a threshold voltage for the rectifier 8, so that the grid bias voltage across the capacitor 7 can reach, at the most, a negative value corresponding to the voltage across the filter 9. This negative value should, preferably, be such that a symmetrical limitation of the current in the two phases of the oscillations across the control-grids is obtained.

What we claim is:

1. A circuit-arrangement for silent tuning in a frequency-modulation receiver comprising an electron discharge device having an anode, a cathode, and a plurality of control grids, and circuits therefor, a resistor disposed in the anode circuit, and means for applying frequency-modulated input oscillations to two of said control grids with a phase shift varying with the frequency-modulation to produce demodulated oscillations across said resistor, said applying means including means for producing grid-current rectification at both of said control grids, a single smoothing filter coupled to both of said control grids, means for producing a single control-grid bias voltage and means to apply said bias voltage to both of said control grids, said resistor having a value at which in the absence of the input oscillations said device operates on a portion of its anode current versus anode voltage curve having a steep slope and when the input oscillations have at least a predetermined magnitude the bias voltages vary automatically to operate said device on a portion of its anode current versus anode voltage characteristic curve having a gradual slope.

2. A circuit-arrangement, as set forth in claim 1, wherein said means for applying frequency-modulated input oscillations further includes two mutually coupled tuned circuits each connected at one end to a different one of said two control grids, said smoothing filter including a capacitor, a resistor and a rectifier, the other end of each of said two mutually coupled tuned circuits being connected through said resistor to said cathode and through a parallel connection of said rectifier and capacitor to a point of voltage which is negative with respect to said cathode, whereby said control-grid voltage is prevented from becoming substantially more negative than the voltage at said negative point.

3. A circuit-arrangement, as set forth in claim 1, wherein said means for applying frequency-modulated input oscillations further includes two mutually coupled tuned circuits each connected at one end to a different one of said two control grids, said smoothing filter including a capacitor, a resistor and a rectifier, the other ends of said two mutually coupled tuned circuits being connected through said resistor to a point of potential positive with respect to said cathode and through a parallel connection of said rectifier and capacitor to a point of potential negative with respect to said cathode, whereby said control-grid voltage is prevented from becoming substantially more negative than the voltage at said negative point.

References Cited in the file of this patent

UNITED STATES PATENTS

| | | |
|---|---|---|
| 2,261,286 | Rankin | Nov. 4, 1941 |
| 2,343,263 | Okrent | Mar. 7, 1944 |
| 2,411,605 | Webb | Nov. 26, 1946 |
| 2,617,022 | Ovetbeek | Nov. 4, 1952 |
| 2,676,247 | Dammers | Apr. 20, 1954 |